J. A. KENWORTHY.
GAS GENERATOR AND BURNER.
APPLICATION FILED JUNE 6, 1921.

1,417,745.

Patented May 30, 1922.

Inventor
James A. Kenworthy
by [signature], Atty.

UNITED STATES PATENT OFFICE.

JAMES A. KENWORTHY, OF LOS ANGELES, CALIFORNIA.

GAS GENERATOR AND BURNER.

1,417,745. Specification of Letters Patent. Patented May 30, 1922.

Application filed June 6, 1921. Serial No. 475,327.

*To all whom it may concern:*

Be it known that I, JAMES A. KENWORTHY, a citizen of the United States, residing at Los Angeles, in the county of Los Angeles, State of California, have invented new and useful Improvements in Gas Generators and Burners, of which the following is a specification.

My invention relates to gas generators and burners, particularly adapted to be placed in the fire boxes of stoves or furnaces for generating hot air and heat therein.

The object of my invention is to provide a simple, durable, inexpensive and efficient device of the above mentioned character, whereby hydrocarbon oils may be thoroughly broken up, vaporized and mixed with air to produce an economical and highly combustible gas, which when ignited produces a flame of intense heat substantially free from carbon.

Another and important object of my invention is to provide a whirling action to the heated air and products of combustion, whereby when they leave the mouth of the burner they will be evenly distributed throughout the confines of the fire box in which the burner is placed.

Other objects will be more fully disclosed in the following description, will be pointed out in the claims, and will be embodied in the accompanying drawings, in which:

Figure 1:
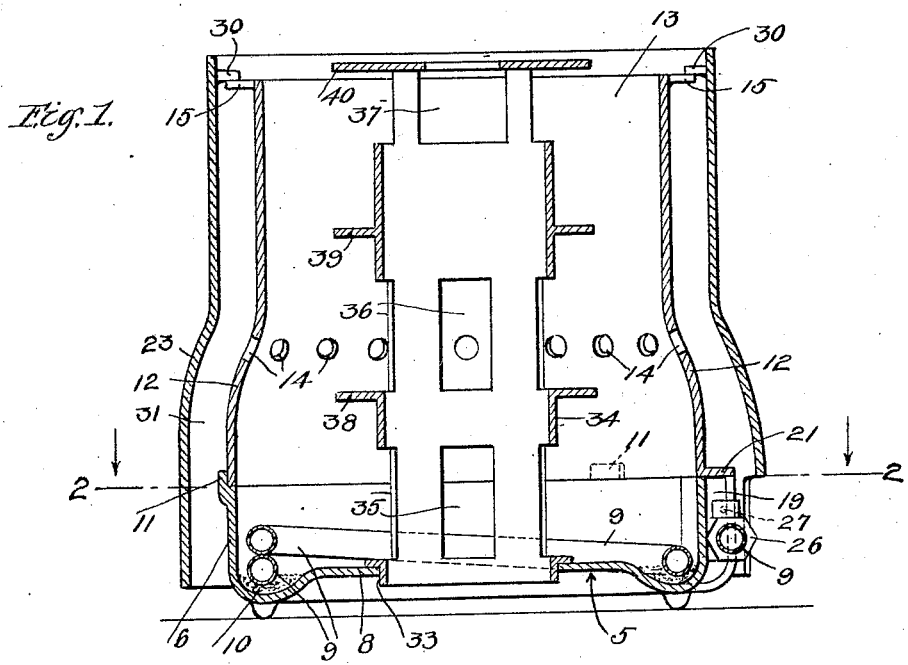
Fig. 1 is a vertical section through my device.

In carrying out my invention I provide a base 5 preferably in the form of a circular pan provided with an annular wall 6, the bottom 7 being provided with a circular groove or depression 8 forming a firing pan. Disposed within the groove or depression 8 is a generator coil 9, preferably formed of copper, brass or other analogous metal.

Mounted above the pan 5 and adapted to be held in alignment with the annular wall 6 thereof by lugs 11 is an open ended metal sleeve 12, which is preferably of smaller diameter at its upper end 13 than the diameter of the pan 5. Sleeve 12 is provided with a plurality of annularly disposed perforations 14 in its wall, and a plurality of outwardly projecting sleeve supporting lugs 15 adjacent its upper end.

The wall 6 of the pan 5 is cut away at 16, and one of its ends 17 projects beyond the opposite end 18 to form an opening 19, said opening being covered by an outwardly extending ledge 21 formed on the lower end of sleeve 12.

Figure 2:
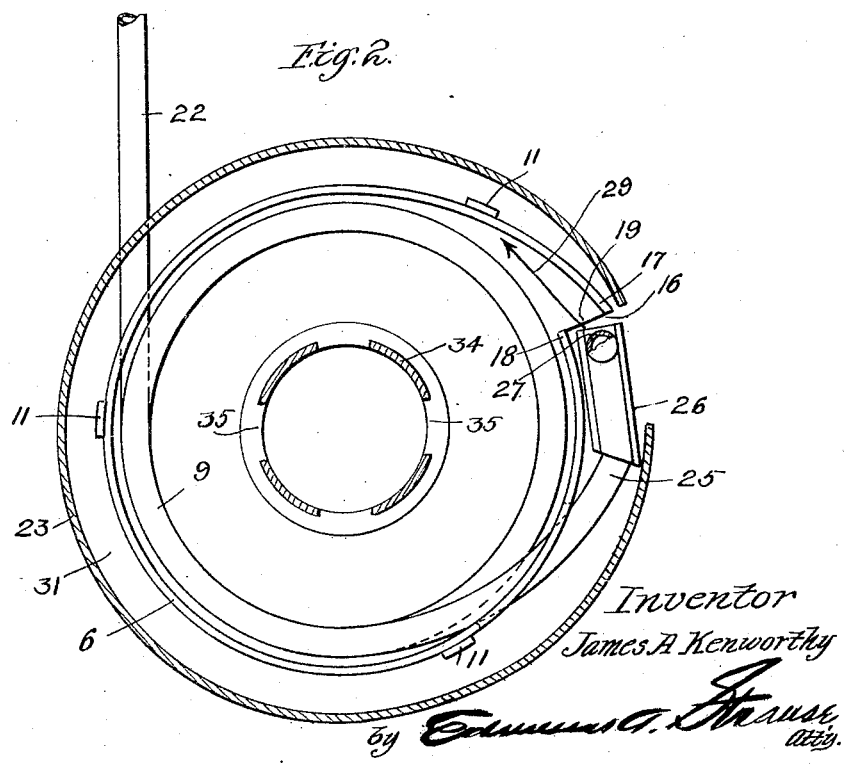
Fig. 2 is a transverse section taken on the line 2—2 of Fig. 1, looking in the direction indicated by the arrows.

The end 22 of the generator coil 10 passes through apertures in the walls of pan 5 and an outer sleeve 23 and leads to the source of oil supply (not shown), and may be provided with the usual oil control valve, (also not shown) and the opposite end 25 of said coil passes through an aperture in the wall of pan 5 and is provided with a suitable generating nozzle 26 having a suitable outlet perforation 27 formed therein arranged in such manner as to inject the spray of gaseous mixture through the opening 19 in a tangential direction against the inner surface of wall 6 of pan 5, as indicated by the arrow 29 in Fig. 2 of the drawings.

The outer sleeve 23 is open at both ends, and is preferably of the same shape as sleeve 12, and is supported in position by means of the inwardly projecting lugs 30 arranged at its upper end, which rest upon the lugs 15 of sleeve 12, thus forming an annular air passage 31 between these sleeves.

The bottom 8 of pan 5 is provided with a centrally disposed aperture 33 in which is disposed an upwardly extending air supply tube 34. The tube 34 is provided with a plurality of groups of apertures 35, 36 and 37 in its wall throughout its length, and a plurality of annular flanges 38, 39 and 40, which extend into the mixing chamber and serve to direct and distribute the air which passes into said mixing chamber through the apertures 35, 36 and 37 in an even manner therein.

In the operation of the generator and burner, the oil in pan 5 is ignited to heat the generator coil 9, as well as the walls of sleeves 12 and 34, thereby vaporizing the oil passing through the generator coil 9. The vapor thus generated discharges through the perforation 27 in the gas discharge nozzle with considerable force through the opening 19 against the inner surface of sleeve 12 tangentially therewith, thereby imparting a whirling action to said vapor, and at the same time sufficient air is drawn through the apertures 35, 36 and 37 and commingles with the vapor to form a highly combustible, well proportioned mixture, which when ignited produces a blue flame of intense heat. By imparting a whirling motion to the gaseous mixture a centrifugal action is set up and as a consequence the ignited gas is thrown out from the top of the burner into the fire box radially, and evenly distributed therein.

As the vapor passes into the mixing chamber the heavier particles of the oil which have not become thoroughly vaporized strike against the wall thereof with a whirling motion, and as a consequence become broken up and thoroughly mixed with the air, thus assuring a perfect combustion.

The heat from the wall of sleeve 12 radiates into the annular passage 31, which starts an upward circulation of hot air therethrough, which is super-heated by a portion of the flame from the mixing chamber passing through the perforations 14 into said passage, thereby directing additional heated air into the spaces to be heated.

What I claim is:

1. A generator and burner, comprising a sleeve closed at its bottom and open at its top forming a mixing chamber, a generator disposed adjacent the bottom of said mixing chamber, the discharge end of which being adapted to direct the vaporized oil therein at a tangent with the inner surface of the wall of said mixing chamber, and means for admitting air into said mixing chamber.

2. A generator and burner, comprising a sleeve closed at its bottom and open at its top forming a mixing chamber, a generator comprising a coil of pipe disposed in the bottom of said mixing chamber the discharge end of which being adapted to direct the vaporized oil therein at a tangent with the inner surface of the wall of said mixing chamber, the wall of said mixing chamber being provided with an air inlet aperture adjacent the discharge end of said generator, and a centrally disposed air supply tube extending through said mixing chamber provided with a plurality of apertures adapted to admit air into said mixing chamber.

3. A generator and burner, comprising a sleeve closed at its bottom and open at its top forming a mixing chamber, the wall of said sleeve being provided with a plurality of perforations, a second sleeve adapted to surround said first mentioned sleeve and form an air passage therebetween, means for admitting air through the center of said mixing chamber, a generator disposed in said mixing chamber adjacent its bottom, the discharge end of which being adapted to direct the vaporized oil therein at a tangent with the inner surface of the wall of said mixing chamber, and means for admitting air into said mixing chamber adjacent the discharge end of said generator.

In witness that I claim the foregoing I have hereunto subscribed my name this 6th day of May, 1921.

JAMES A. KENWORTHY.